March 3, 1970 C. D. WEISS 3,497,942
METHOD OF WELDING TUNGSTEN CARBIDE MATERIALS TO STEEL
Filed April 21, 1967 2 Sheets-Sheet 1

INVENTOR.
CARL D. WEISS

BY
ATTORNEYS

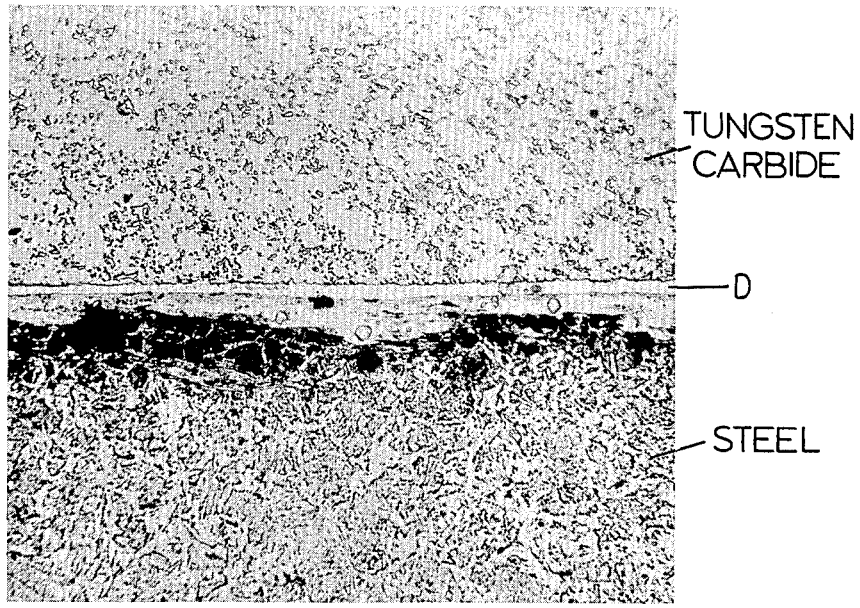
Fig-2-
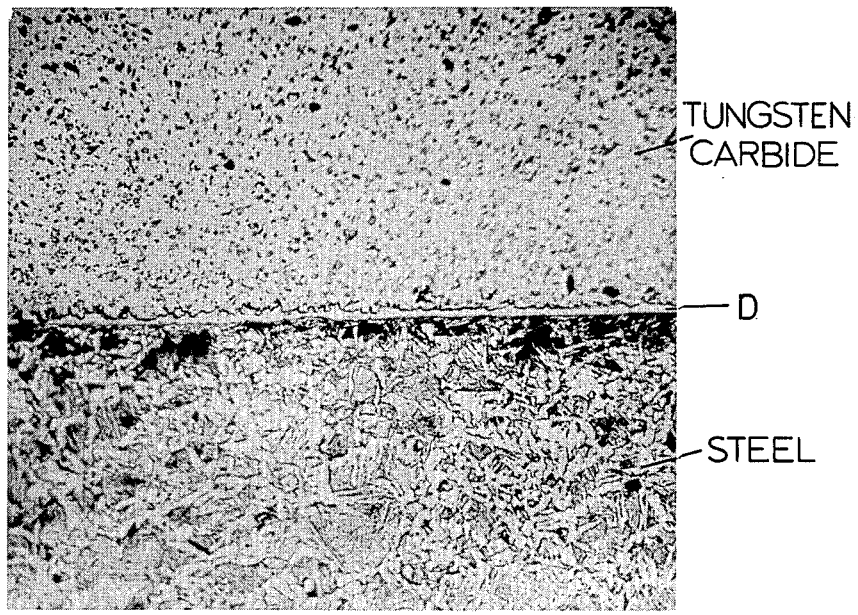
Fig-3-
INVENTOR.
CARL D. WEISS

United States Patent Office 3,497,942
Patented Mar. 3, 1970

3,497,942
METHOD OF WELDING TUNGSTEN CARBIDE MATERIALS TO STEEL
Carl D. Weiss, Peoria, Ill., assignor to Caterpillar Tractor Co., Peoria, Ill., a corporation of California
Filed Apr. 21, 1967, Ser. No. 632,588
Int. Cl. B23k 27/00
U.S. Cl. 29—470.3                3 Claims

ABSTRACT OF THE DISCLOSURE

Method of joining tungsten carbide materials to steel by the inertial welding process including parameters for surface velocity, upset pressure and energy used to make satisfactory welds.

Background of the invention

Tungsten carbide materials are widely used for many industrial applications such as dies and facings on cutting tools, punches and drills. In most instances the carbide is used only as a cutting face and is joined to another supporting member of a different material by brazing or a combination of mechanical lock and brazing. Thus, tungsten carbide is recognized as a material which is very useful in the industrial field because of its extreme hardness and resistance to abrasion. However, these same properties, plus the brittleness of tungsten carbide, make it a very difficult material to work with. More particularly, these tungsten carbide materials are extremely difficult, if not impossible, to weld by conventional methods.

The primary object of this invention relates to a method of joining tungsten carbide materials to steel by utilizing the inertial welding process.

Other and more specific objects of the invention relate to the necessary parameters for surface velocity, upset pressure and input energy used to make satisfactory welds when joining tungsten carbide materials to steel by the inertial welding process.

Inertial welding of the general type disclosed herein relates to a process wherein two parts to be bonded are engaged in rubbing contact at a common interface to heat the interface to a bondable condition. In the inertial welding process the energy required to bring the interface to a bondable condition is stored as kinetic energy in rotating inertial weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating inertial weights to a stop at the conclusion of the bonding cycle. The present invention presents a solution to the prior art problem of joining tunsten carbide materials to steel by providing a method of bonding these materials through means of the inertial welding process.

The objects and advantages of the present invention will be apparent from the following description and claims and are illustrated in the accompanying drawings which, by way of illustration, show a preferred embodiment of the present invention and the principles thereof and what is now considered to be the best mode contemplated for applying these principles. It is recognized that other embodiments of the invention embodying the same or equivalent principles may be used and structural changes may be made as desired by those skilled in the art without departing from the present invention and the purview of the appended claims.

Description of the preferred embodiment

Figure 1:
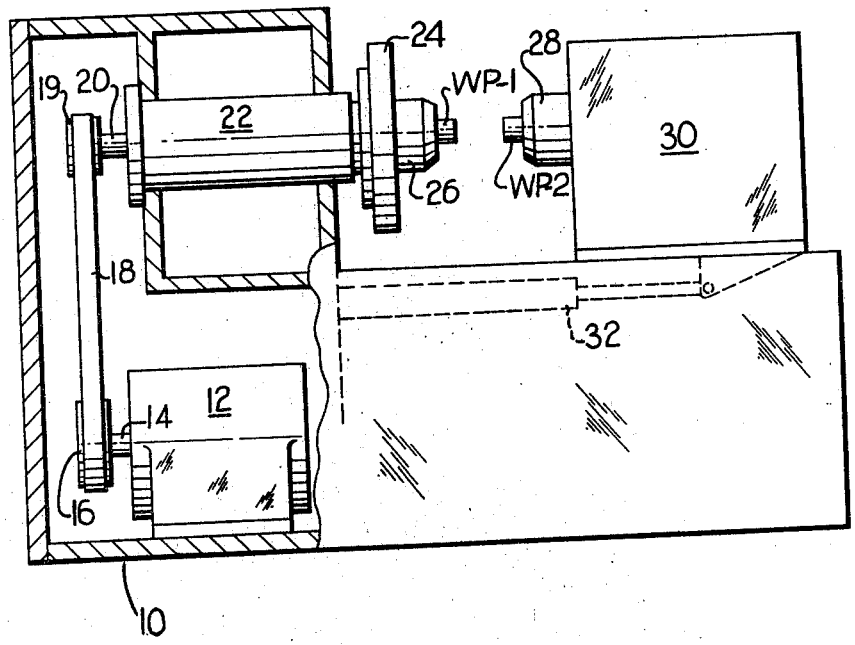
FIG. 1 is a side elevation, partially in section, illustrating one embodiment of an inertial welding machine which may be used to practice the method of the present invention; and, FIGS. 2 and 3 are photomicrographs illustrating specimens of tungsten carbide materials which have been bonded to steel by the method of the present invention.

FIG. 1 illustrates an embodiment of an inertial welding machine which may be used to carry out the method of the present invention. As shown, the machine comprises a base plate and housing structure generally denoted at 10 for housing the various elements of the machine. Mounted on the base plate 10 is a main drive motor 12. The motor 12 has an output shaft 14 the outer end of which is provided with a pulley member 16. An endless belt 18 connects the output shaft 14 with a pulley 19 on the input shaft 20 of a rotary spindle 22. The rotary spindle 22 is adapted to receive inertial flywheels 24 which may be of various size and mass depending upon the particular application of the machine. The spindle 22 is also provided with a rotary chuck 26 which is adapted to grip a workpiece WP–1. A second workpiece WP–2 is fixedly held in a non-rotating chuck 28. The chuck 28 is mounted in a tailstock member 30 which may be moved axially toward and away from the spindle 22 by any suitable means such as the ram 32 shown in dashed outline in FIG. 1.

An inertial welding operation to join a first workpiece such as a tungsten carbide material to a second workpiece such as steel can be performed by operating the machine in the following general manner. One of the weld pieces WP–1, normally the steel member, is firmly clamped in the rotatable chuck 26 located on the spindle 22. The other weld piece WP–2, normally the tungsten carbide material, is firmly clamped in the non-rotatable chuck 28 which is located on the tailstock portion 30 of the machine. Upon actuation of the motor 12, the flywheel and steel workpiece WP–1 are accelerated to a predetermined velocity.

Once the predetermined velocity has been obtained, the motor 12 is shut down and the ram mechanism 32 is actuated to move the tailstock portion 30 and tungsten carbide workpiece WP–2 into contact with the rapidly rotating workpiece WP–1. As the two workpieces are brought into contact under the upsetting pressure applied through ram 32 heat is generated at the contacting surfaces or interface of the weld pieces. This heating increases until the pieces reach the weld temperature, at which time the upsetting pressure, applied by the ram 32 at either a constant or increasing pressure, causes flashing or upsetting to occur. During this heating and flashing the rotational velocity of the spindle member 22 has continued to decrease. At the time the rotation of the spindle ceases, upsetting has taken place and the weld is completed.

To illustrate the manner in which the inertial welding process has been utilized to join tungsten carbide materials to steel, and the manner in which the parameters involved in the instant invention were in part derived, the following examples are given. It is to be understood, however, that the examples are for the purpose of illustration and the invention is not to be regarded as limited to any of the specific materials or conditioned recited therein.

Example 1

This example involves the inertial welding of one-half inch diameter carbide (tungsten carbide in cobalt matrix) to ⅝ inch diameter SAE 1018 carbon steel. Good welds were made with these materials using a surface speed range of 419–654 feet per minute, an energy input range of 42,500 to 45,000 ft.-lbs. per square inch, using a flywheel inertial mass of 2–5 lb.-ft.$^2$, and an axial pressure range of 15,000–22,000 lbs. per square inch.

Example 2

This example involved the inertial welding of 0.8 inch diameter bars of K801 (nickel matrix) and 3411 (cobalt matrix) carbide materials to one inch diameter SAE 8822 alloy steel bars. Good welds were made with these materials using a surface speed of 1150 feet per minute, an energy input of 51,000 ft.-lbs. per square inch, using a flywheel inertial mass of 5 lb.-ft.$^2$ and an axial pressure of 19,000 lbs. per square inch. Several of these welds were impact tested and failed generally in the carbide material out of the weld interface. With a good weld, this would be expected since the carbide material is extremely brittle.

FIGS. 2 and 3 show photomicrographs of what are considered to be very good tungsten carbide to steel welds formed by the inertial welding process within the parameters comprising the present invention. It will be noted that in both figures the carbide material (top of the photomicrographs) is joined to the steel (bottom of the photomicrographs) by an intermediate diffusion layer D shown in the center of the photomicrographs. The forming of this intermediate diffusion layer during welding is important because it becomes the agent joining the brittle tungsten carbide to the steel. At this time it is not thought that the exact thickness of the diffusion layer D is of prime importance so long as it is present. The materials in the two photomicrographs of FIGS. 2 and 3 have been etched with a one percent nital solution (1% nitric acid and 99% alcohol), and have been magnified 500 times.

From the work done involving many samples and various test programs, parameter ranges have been established for the inertial welding of tungsten carbide materials to carbon alloy steels. These parameter ranges are:

Surface velocity—400 to 1150 feet per minute
Axial pressure—15,000 to 22,500 lbs. per square inch
Input energy—42,500 to 51,000 ft.-lbs. per square inch Thus, satisfactory welding of tungsten carbide materials to steel materials may be obtained by a method utilizing the inertial welding process within the above parameter ranges. It is believed, however, that these parameters involve approximate rather than strict limits and good welds may be obtained using parameters somewhat outside of these ranges and this is especially true on the high side of the ranges.

I claim:

1. Method of inertial welding a first workpiece of tungsten carbide material to a second workpiece of carbon or alloy steels comprising:

placing one of said workpieces in a rotatable chunk and rotating said chunk to effect a predetermined surface velocity of said one workpiece of approximately 400 to 1150 feet per minute;
 operatively associating a mass with said rotating workpiece to produce a predetermined input energy factor of approximately 42,500 to 51,000 ft.-lbs. per square inch; and,
 relatively moving said workpieces into frictional engagement at their common interface under a predetermined axially applied pressure of approximately 15,000 to 22,500 pounds per square inch to produce an energy transfer at the interface which concentrates heat at the interface until a bond is formed and all the input energy is expended.

2. A method as set forth in claim 1 wherein the steel workpiece is placed in said rotating chuck and the carbide workpiece is placed in a non-rotating chuck, and wherein said carbide workpiece is axially moved into frictional engagement, under pressure, with said steel workpiece.

3. A method of inertial welding a first workpiece of tungsten carbide material to a second workpiece of carbon or alloy steel, comprising the steps of:

rotating one workpiece to impart a predetermined surface velocity to said workpiece;
 operatively associating a mass with said rotating workpiece to produce a predetermined input energy factor;
 relatively moving said workpieces into frictional engagement at their common interface under a predetermined axially applied pressure; and
 controlling the parameters of surface velocity, input energy factor, and axial pressure to effect an energy transfer at the interface which concentrates heat at the interface to produce a discernible diffusion layer at the interface which acts as a bond between the workpieces.

References Cited

UNITED STATES PATENTS

| | | | |
|---|---|---|---|
| 3,365,789 | 1/1968 | Brown | 29—504 |
| 3,279,049 | 10/1966 | Ellis et al. | 29—504 |
| 3,235,157 | 2/1966 | Hollander | 29—470.3 XR |
| 3,121,948 | 2/1964 | Hollander et al. | 29—470.3 |

FOREIGN PATENTS

| | | |
|---|---|---|
| 963,692 | 7/1964 | Great Britain. |
| 963,689 | 7/1964 | Great Britain. |

CHARLIE T. MOON, Primary Examiner

RICHARD BERNARD LAZARUS, Assistant Examiner

U.S. Cl. X.R.

29—504; 228—2